July 3, 1951  C. C. SCHULTZ  2,559,133
REPACKABLE OIL FILTERING CARTRIDGE
Filed Jan. 10, 1949  2 Sheets-Sheet 1

Inventor
Charles C. Schultz
by W. S. J. M.
ATTORNEY

July 3, 1951  C. C. SCHULTZ  2,559,133
REPACKABLE OIL FILTERING CARTRIDGE
Filed Jan. 10, 1949  2 Sheets-Sheet 2

Inventor
Charles C. Schultz
by W. S. J. Miller
ATTORNEY

Patented July 3, 1951

2,559,133

UNITED STATES PATENT OFFICE 2,559,133

REPACKABLE OIL FILTERING CARTRIDGE

Charles C. Schultz, Calgary, Alberta, Canada

Application January 10, 1949, Serial No. 70,037
In Canada February 13, 1948

2 Claims. (Cl. 210—62)

My invention relates to a repackable filter cartridge for use within a case in the process of elimination of sludge and such foreign matter from the oil used in lubrication of engines, with particular reference to internal combustion engines, and comprises such parts as will allow the filtering material contained therein to be ejected by hand for replacement with a fresh supply.

The advantage of my invention is that the filtering material, such as ordinary "waste," is slidably ejectable from the perforated cartridge shell, and the cartridge as a container for the "waste" is usable indefinitely, and is repackable with clean "waste" when necessary.

A further advantage is that the "waste" may be readily examined to ascertain that proper filtering is taking place without having to destroy the cartridge, as is the case with conventional oil filtering cartridges.

Still further advantages are that this cartridge is of very simple construction, and its main object provides for quick inspection and repacking, and that there are no screws or nuts to manipulate, and the ends of a locking bale are merely drawn together to eject the contents by pushing a bottom plate upwardly inside the cartridge shell.

With the above mentioned objects and advantages in view this invention consists in the novel features of construction hereinafter described and claimed, and in the drawings accompanying this specification it must be observed that similar numerals refer to similar parts throughout the different views.

Figure 1:
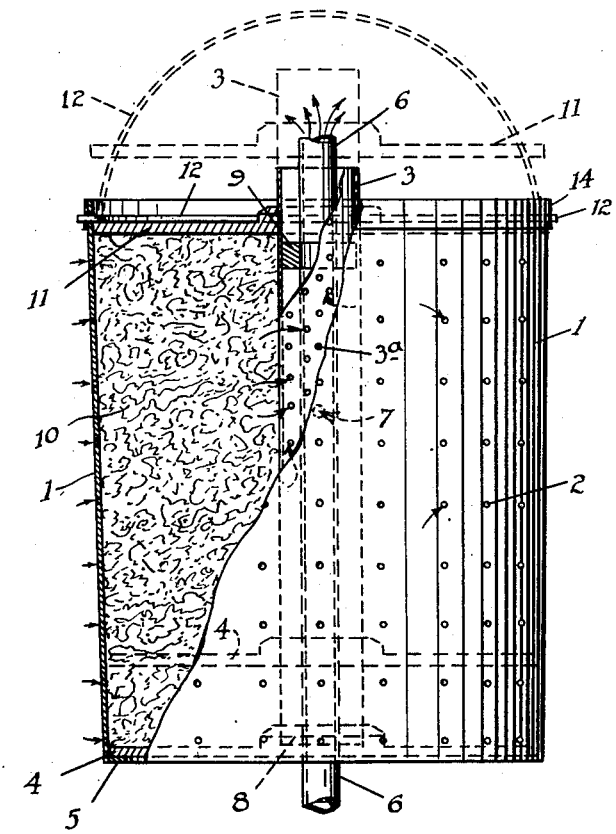
Fig. 1 is a fragmented elevational view of the oil cartridge.
Figure 2:
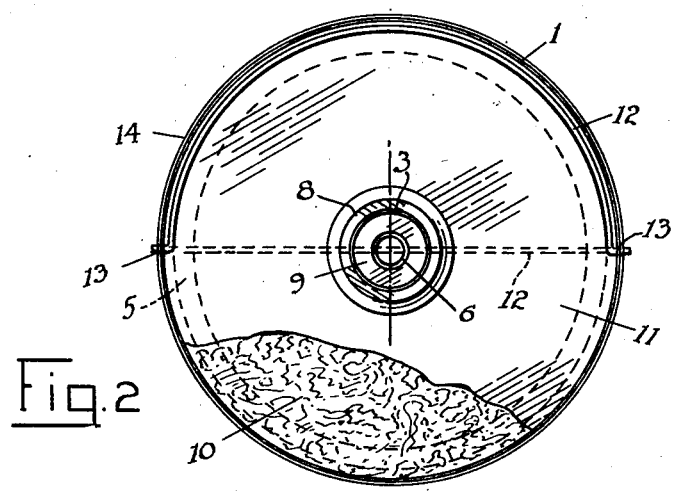
Fig. 2 is a fragmented plan view.
Figure 3:
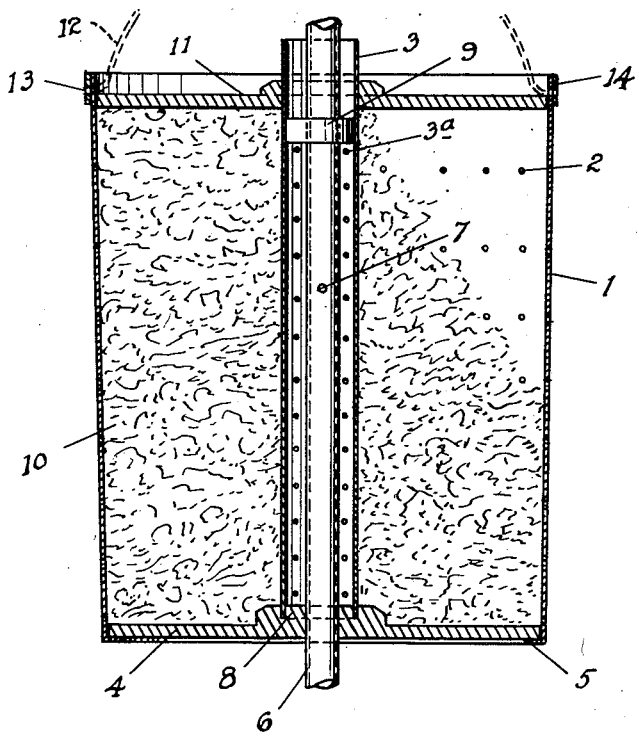
Fig. 3 is a sectional view showing the built in upper and lower seals and the supporting hollow bolt.
Figure 4:
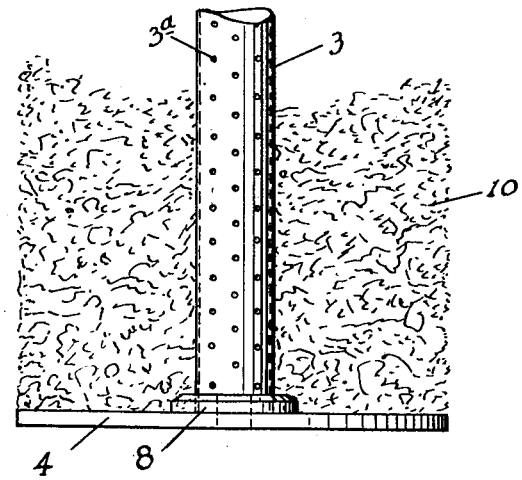
Fig. 4 shows the base push plate and the attached perforated tube.

In the drawings the numeral 1 refers to a circular tapered cartridge or cartridge shell for use with oil filters and having perforations 2 apertured through the wall thereof. This cartridge wall is tapered from a larger top diameter to its lesser diameter bottom opening as understood when in its normal operational position, in order to facilitate its removal from an oil containing oil filter case (not shown).

A tube 3 is centrally disposed within the cartridge, and is also perforated as at 3a throughout its length within the cartridge. The tube is axially parallel with the cartridge and projects above the top of same. A circular push plate 4 is affixed to the bottom end of said tube 3 and fits closely within the bottom of the cartridge, and is loosely slidable therewithin from bottom to top. A circular flange 5 acts as a stop to hold this plate 4 within the cartridge.

A hollowed cartridge-supporting bolt 6 has an oil-passaging aperture 7 located within the height of the cartridge. The juncture of the tube 3 within the plate 4 is so formed as to provide a sealing plug 8 between the said bolt 6 and the slidably contacted plug. A second sealing plug 9 within and near the top of the tube 3 within the height of the cartridge confines the oil passing through the perforations 3a to the annular space between tube 3 and bolt 6. From this space the oil passes through the aperture 7 for escape through the said oil-passaging bolt 6.

The cartridge shell 1 is filled with oil filtering material 10 such as ordinary "waste," surrounding the tube 3, and which material is held in place by means of an annular top covering disc 11 slidable within the top of the cartridge, and fits over the said centre tube 3.

A handling bale 12 is sprung into diametrically disposed holes 13 in the cartridge wall, and acts as a retainer in its vertical or flat positions to keep the flat disc 11 in place on top of the filter "waste."

To release the top disc 11 the ends of the bale are drawn together and the bale removed, and to eject the "waste" the bottom plate 4 is pushed upwardly and slidably through the cartridge shell. When repacked with clean "waste" the cartridge is placed in an oil filled conventional oil filter case, and the oil passes through the perforations 2 filtering through the "waste," thence passing through the apertures 3a into the tube 3 and out through the hollow bolt 6 by way of the aperture 7 therein for return to the lubricating system. This oil passaging process may be reversed in direction from the inside of the bolt 6 to and through the cartridge wall. The top elge of the cartridge wall may be reinforced with an added band 14.

What I desire to secure by Letters Patent is:

1. In a perforated cylindrical type oil filtering cartridge as described for immersion in an oil filled container, and containing filtering material, a central perforated tube within the cartridge to fit over a supporting bolt hollowed and apertured for the passage of filtered or partly filtered oil therethrough and in spaced relationship therewith, an annular oil sealing plug at each end of said tube to slidably fit over said central bolt, a disc attached to the base end of said tube and slidably fitting within the filter wall for slidable ejection of the contained filtering material therefrom, means at the base end of said container to retain the said disc therein, an annular top disc slidable on said tube to hold the filtering material in place within the cartridge, and a bale sprung into holes in the cartridge wall to retain said top disc in place.

2. A repackable type oil filter cartridge comprising an outer cylindrically shaped filtering waste container slightly tapered for easy removal from its case, and with wall perforations, filtering waste in said container, a central columnar perforated tube within said outer container and in spaced relationship therewith and affixed at one end to a circular push plate slidable through said container upwardly from the lesser diameter loosely towards the greater inside diameter thereof to remove the waste, a turned in flange around the base of said container to retain said push plate, an annular disc slidable over the upper end of said central tube to hold the waste in place within said container, a bale sprung into holes in the container wall to retain said disc in place, and means to slidably support said tube in a sealed manner at each end thereof on a filter cartridge supporting bolt for the passage and delivery of oil therethrough as received from the said tube.

CHARLES C. SCHULTZ.

REFERENCES CITED

The following references are of record in the file of this patent:

UNITED STATES PATENTS

| Number | Name | Date |
| --- | --- | --- |
| 1,930,209 | Milkey | Oct. 10, 1933 |
| 2,247,445 | Long | July 1, 1941 |
| 2,275,481 | Wilkinson | Mar. 10, 1942 |
| 2,280,033 | Aldham | Apr. 14, 1942 |
| 2,294,262 | Wilkinson | Aug. 25, 1942 |
| 2,342,948 | Long | Feb. 29, 1944 |
| 2,364,240 | Parry | Dec. 5, 1944 |
| 2,463,929 | West | Mar. 8, 1949 |

OTHER REFERENCES

Filtration and Filters, Pickard, pp. 33-34, Ernest Benn Lmt., 1929.